| (12) | United States Patent | (10) Patent No.: | US 9,122,489 B1 |
|---|---|---|---|
| | Vanderpool | (45) Date of Patent: | Sep. 1, 2015 |

(54) EXTENDED LANGUAGE PRECOMPILER

(71) Applicant: WAL-MART STORES, INC., Bentonville, AR (US)

(72) Inventor: Clifford V. Vanderpool, Centerton, AR (US)

(73) Assignee: Wal-Mart Stores, Inc., Bentonville, AR (US)

( * ) Notice: Subject to any disclaimer, the term of this patent is extended or adjusted under 35 U.S.C. 154(b) by 0 days.

(21) Appl. No.: 14/205,978

(22) Filed: Mar. 12, 2014

Related U.S. Application Data

(60) Provisional application No. 61/779,454, filed on Mar. 13, 2013.

(51) Int. Cl.
*G06F 9/45* (2006.01)

(52) U.S. Cl.
CPC . *G06F 8/427* (2013.01); *G06F 8/41* (2013.01)

(58) Field of Classification Search
CPC .................................. G06F 8/41; G06F 8/427
USPC .................................................. 717/140, 143
See application file for complete search history.

(56) References Cited

U.S. PATENT DOCUMENTS

| 5,903,859 | A | * | 5/1999 | Stone et al. ........................ 704/8 |
|---|---|---|---|---|
| 6,161,216 | A | * | 12/2000 | Shagam ........................ 717/128 |
| 6,421,826 | B1 | * | 7/2002 | Kosche et al. ................. 717/161 |
| 6,487,713 | B1 | * | 11/2002 | Cohen et al. ................... 717/105 |
| 6,493,661 | B1 | * | 12/2002 | White et al. ....................... 704/8 |
| 8,122,440 | B1 | * | 2/2012 | Lentini et al. ................. 717/141 |
| 8,453,126 | B1 | * | 5/2013 | Ganelin ........................ 717/136 |
| 8,677,314 | B1 | * | 3/2014 | Silverstein et al. ........... 717/110 |
| 2002/0184615 | A1 | * | 12/2002 | Sumner et al. ................ 717/130 |
| 2003/0115574 | A1 | * | 6/2003 | Garvey ......................... 717/120 |
| 2010/0153939 | A1 | * | 6/2010 | Stall et al. ..................... 717/158 |

OTHER PUBLICATIONS

"Precompiler Customization", Version 8.2, IBM DB2 Universal Database, 1997-2004.
Pro*COBOL Programmer's Guide, Release 9.2, Part No. A96109-03, Oracle, Dec. 2003.

* cited by examiner

*Primary Examiner* — Phillip H Nguyen
(74) *Attorney, Agent, or Firm* — Schmeiser, Olsen & Watts LLP

(57) ABSTRACT

A system is provided that is adapted to process source code. In one implementation, and extended language precompiler is provided that processes source code according to user-definable parameters which permits a number of actions to be performed with respect to the code prior to compilation. In one example, the precompiler may insert, replace, analyze or substitute code within the original source code, and produce output source code that can be compiled by a compiler.

20 Claims, 5 Drawing Sheets

EXTENDED LANGUAGE PRECOMPILER

RELATED APPLICATIONS

This application claims priority under 35 U.S.C. §119(e) to U.S. Provisional Patent Application Ser. No. 61/779,454, entitled "EXTENDED LANGUAGE PRECOMPILER," filed on Mar. 13, 2013, which application is herein incorporated by reference in its entirety.

NOTICE OF MATERIAL SUBJECT TO COPYRIGHT PROTECTION

Portions of the material in this patent document are subject to copyright protection under the copyright laws of the United States and of other countries. The owner of the copyright rights has no objection to the facsimile reproduction by anyone of the patent document or the patent disclosure, as it appears in the United States Patent and Trademark Office publicly available file or records, but otherwise reserves all copyright rights whatsoever. The copyright owner does not hereby waive any of its rights to have this patent document maintained in secrecy, including without limitation its rights pursuant to 37 C.F.R. §1.14.

BACKGROUND

There are many different methods for processing and generating code. For instance, there are systems for managing and automatically generating code, parsing and compiling source code in a variety of higher-level computer languages.

SUMMARY

According to one aspect, it is appreciated that it may be useful and particularly advantageous to allow a preprocessor to perform a number of different functions for the purposes of automatically generating code and improving its qualities, among other possible functions. According to one embodiment, an extended language precompiler system is provided that allows for source code to be parsed and changed prior to compilation. For instance, the precompiler may be configured to analyze source code, identify one or more elements of the code that causes the precompiler to perform functions on the code prior to compilation, and provide output source code which then can be compiled. An external scripting language may be provided that allows for source code to be processed in a variety of ways that can be user-controlled. Thus, the ability to process code is increased and programming may be improved by providing a precompiler that may be user-controlled to modify code in an automatic manner.

According to one embodiment, an extended language precompiler, herein referred to as ELP, may be provided as an extension to existing languages such as COBOL. In one implementation, the ELP application may be provided as part of the "compile" process for high level languages. In one example, the ELP may be adapted to preprocess original source code. In particular, the ELP may identify macros contained within source code, convert any identified macros or tags into instructions of the native language prior to being fed into the language compiler.

Although one use of an ELP is to parse source code, it should be appreciated that the ELP could be used to process any high level language. In one implementation of the ELP, an ELP system breaks down the source code instructions to individual components that can be processed by an internal scripting language provided by the ELP system. For instance, the ELP system may scan a source code file for one or more predefined keyword tags. For instance, "EXEC ELP" or "-ELP" tags placed in the source code file by a programmer or other entity identify ELP macros which can be scanned and identified by a parser. The identification of such tags may trigger a corresponding script associated with each macro that can modify or inject code as necessary. Code development is simplified by taking common programmable functionality, and reducing the functionality to simple macros or tags that cause the ELP system to inject code accordingly. Further, by creating a standard simple interface, efficiency of developers is improved and development errors are reduced from the manual effort of typing the code.

Further, in another embodiment, an ELP system can be used to evaluate source code for inefficiencies, optimizing the code and evaluate coding standards. In one embodiment, an ELP system may be adapted to scan for specific instructions that can be evaluated for performance and modified to improve the code. Optionally, the ELP system may be configured to send notifications to the developer (or other system) to change the code (e.g., manually).

Another aspect of the present invention includes a new scripting language and a generic text parsing engine. In one embodiment, the parsing engine is used by the ELP system to parse the different components like the COBOL code, ELP macros and scripts defined within a scripting language. The parsing engine may be configured to parse other languages like C or Eztrieve to perform the same functions of evaluating, manipulating and injecting code. Another component is the scripting language. Based on tags or other identifiers within the parsing commands, one or more scripts are triggered that are used to modify the original source text.

According to another embodiment, a new scripting language is provided by the ELP system that permits the user to create script that can read and write to files, trigger events, access elements from the text parsing engine and call external programs to perform additional functionality. Scripts can also be used to generate external programs, call a compiler to compile the newly generated code and link the code into or with the original source.

For instance, an example of an ELP macro could be "load DB2 table". Traditionally a developer would have to write all of the code to define the cursor to access the data, each of the open, fetch and close commands to read the data, define internal table structure to hold the data and basic instructions to move the DB2 data into the internal array. This process can be somewhat lengthy and time-consuming for developers, and because the coding is performed manually, there are opportunities to introduce errors into the program. The ELP macro can be used instead to specify the table name, columns from the table and the structure to load from the DB2 data. With a single macro definition, the ELP system generates all the code necessary to read the DB2 table and populate the internal table structure.

According to one aspect, a system for processing source code is provided. The system comprises a parsing engine configured to process at least one portion of source code, the parsing engine being configured to identify at least one macro element within the at least one portion of code; and a script executing engine adapted to execute one or more scripts that are capable of performing one or more actions with respect to processing the source code prior to a compile action, the script engine performing the one or more actions responsive to the identification of the at least one macro element.

In one embodiment, the one or more actions includes modifying the at least one portion of source code responsive to the identification of the at least one macro element. In one embodiment, the one or more actions includes injecting code into the at least one portion of source code responsive to the identification of the at least one macro element. In one embodiment, the one or more actions includes performing an optimization of the at least one portion of source code responsive to the identification of the at least one macro element. In one embodiment, the system being adapted to produce one or more portions of output source code. In one embodiment, the system is operable to compile the one or more portions of output source code.

In one embodiment, the one or more actions includes modifying the at least one portion of source code to include program code to read input data, the input data being defined within a database separate from the at least one portion of source code. In one embodiment, the one or more actions includes performing at least one program call of an outside program responsive to the identification of the at least one macro element. In one embodiment, the one or more actions includes sending a notification including information relative to a processing of the at least one portion of source code responsive to the identification of the at least one macro element. In one embodiment, at least one of the one or more scripts are provided by a programmer to selectively process the source code prior to the compile action. In one embodiment, the one or more actions includes replacing a standard programming operator within the at least one portion of source code with code associated with a custom operator.

According to one aspect, a method for processing source code is provided. The method comprises acts of parsing at least one portion of source code, the act of parsing comprising an act of identifying at least one macro element within the at least one portion of code; and executing, responsive to the identification of the at least one macro element, one or more scripts that perform one or more actions with respect to processing the source code prior to a compile action.

In one embodiment, the one or more actions includes an act of modifying the at least one portion of source code responsive to the identification of the at least one macro element. In one embodiment, the one or more actions includes an act of injecting code into the at least one portion of source code responsive to the identification of the at least one macro element. In one embodiment, the one or more actions includes an act of performing an optimization of the at least one portion of source code responsive to the identification of the at least one macro element. In one embodiment, the method further comprises an act of producing one or more portions of output source code. In one embodiment, the method further comprises an act of compiling the one or more portions of output source code. In one embodiment, the one or more actions includes an act of modifying the at least one portion of source code to include program code to read input data, the input data being defined within a database separate from the at least one portion of source code.

In one embodiment, the one or more actions includes an act of performing at least one program call of an outside program responsive to the identification of the at least one macro element. In one embodiment, the one or more actions includes an act of sending a notification including information relative to a processing of the at least one portion of source code responsive to the identification of the at least one macro element. In one embodiment, at least one of the one or more scripts are provided by a programmer, and the method further comprises an act of selectively processing the source code prior to the compile action responsive to the at least one provided script. In one embodiment, the method further comprises an act of replacing a standard programming operator within the at least one portion of source code with code associated with a custom operator.

Still other aspects, examples, and advantages of these exemplary aspects and examples, are discussed in detail below. Moreover, it is to be understood that both the foregoing information and the following detailed description are merely illustrative examples of various aspects and examples, and are intended to provide an overview or framework for understanding the nature and character of the claimed aspects and examples. Any example disclosed herein may be combined with any other example in any manner consistent with at least one of the objects, aims, and needs disclosed herein, and references to "an example," "some examples," "an alternate example," "various examples," "one example," "at least one example," "this and other examples" or the like are not necessarily mutually exclusive and are intended to indicate that a particular feature, structure, or characteristic described in connection with the example may be included in at least one example. The appearances of such terms herein are not necessarily all referring to the same example.

BRIEF DESCRIPTION OF THE DRAWINGS

Various aspects of at least one example are discussed below with reference to the accompanying figures, which are not intended to be drawn to scale. The figures are included to provide an illustration and a further understanding of the various aspects and examples, and are incorporated in and constitute a part of this specification, but are not intended as a definition of the limits of a particular example. The drawings, together with the remainder of the specification, serve to explain principles and operations of the described and claimed aspects and examples. In the figures, each identical or nearly identical component that is illustrated in various figures is represented by a like numeral. For purposes of clarity, not every component may be labeled in every figure. In the figures:

DETAILED DESCRIPTION

Figure 1:
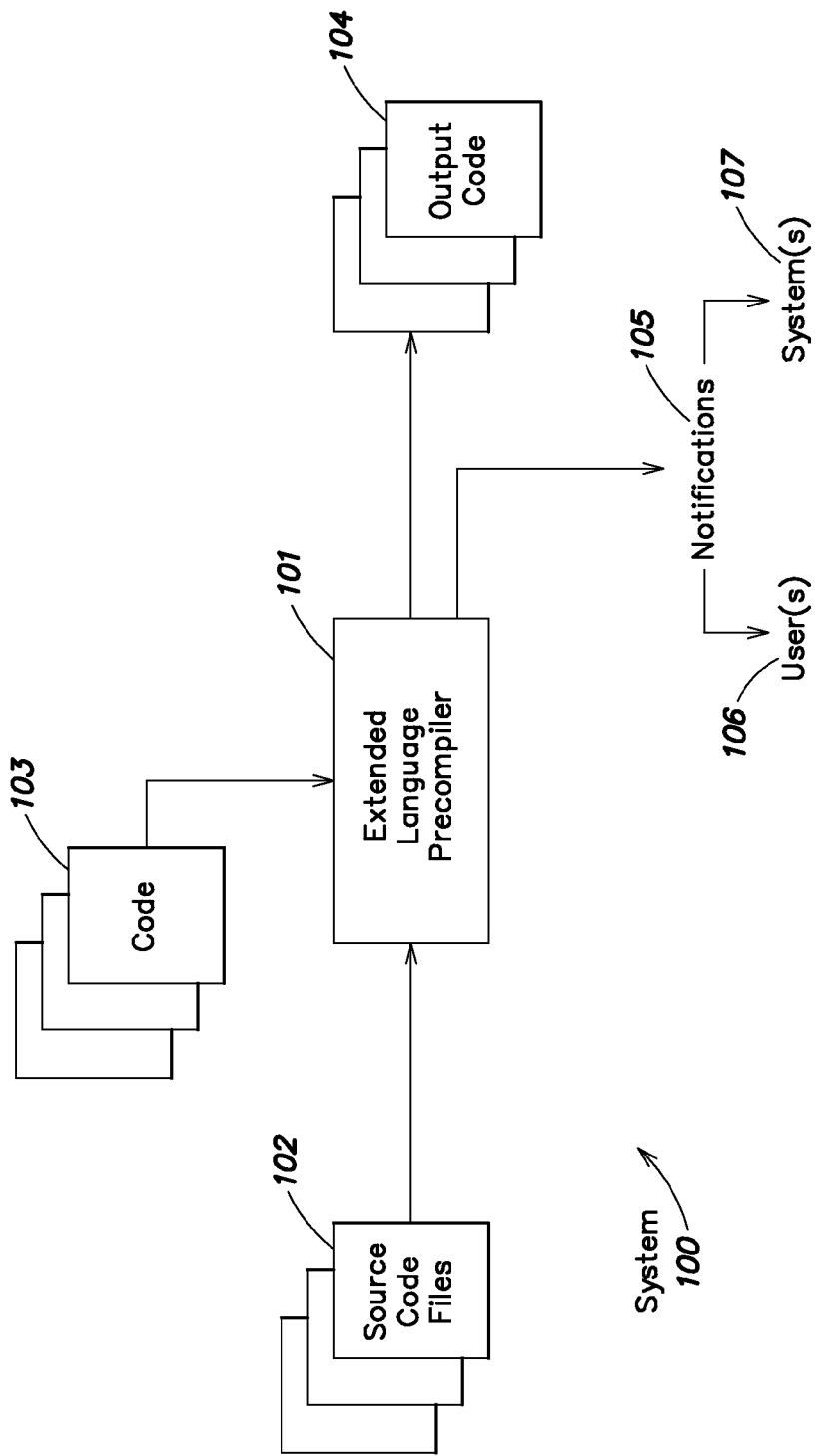
FIG. 1 is a block diagram showing a system for processing source code according to various aspects of the present invention.

FIG. 1 shows a block diagram of a system 100 suitable for implementing various aspects of the present invention. In particular, according to one embodiment, FIG. 1 shows a system 100 that includes an extended language compiler 101 that is capable of implementing various aspects of the present invention.

Extended language precompiler 101 (hereinafter "ELP" 101) receives one or more source code files 102. Such was may be received, for example, from a filesystem associated with a computer system. In one embodiment, ELP 101 receives such source code files, identifies control information within such files that causes ELP 101 to initiate a preprocessing activity on those files. For instance, a macro or other tag may be embedded within the files, that when processed by ELP 101, causes the source code files to be processed. For instance, a set of tags may be included within a section of source code files that when read, causes the preprocessor to analyze the code indicated by the tags.

In one embodiment, ELP 101 may be adapted to insert code indicated by the tags from one or more sources of code (e.g., code 103). The sources of code may be merged or inserted into the existing source code. According to one embodiment, the code inserted may depend upon one or more parameter values indicated within the source code file, switches, or other type of information. ELP 101 may perform other processing of the source code instead or in addition to a code insertion, such as an optimization of code, an inspection and any notification of issues with the code, formatting of the code, or other process. In the case of a notification, the system may produce one or more notification messages 105 (e.g., an email, signal, exception, or other notification type). Such a notification may be sent to any entity, such as user(s) 106 (e.g., one or more programmers), system (e.g., system(s) 107), application or other type of entity.

Figure 2:
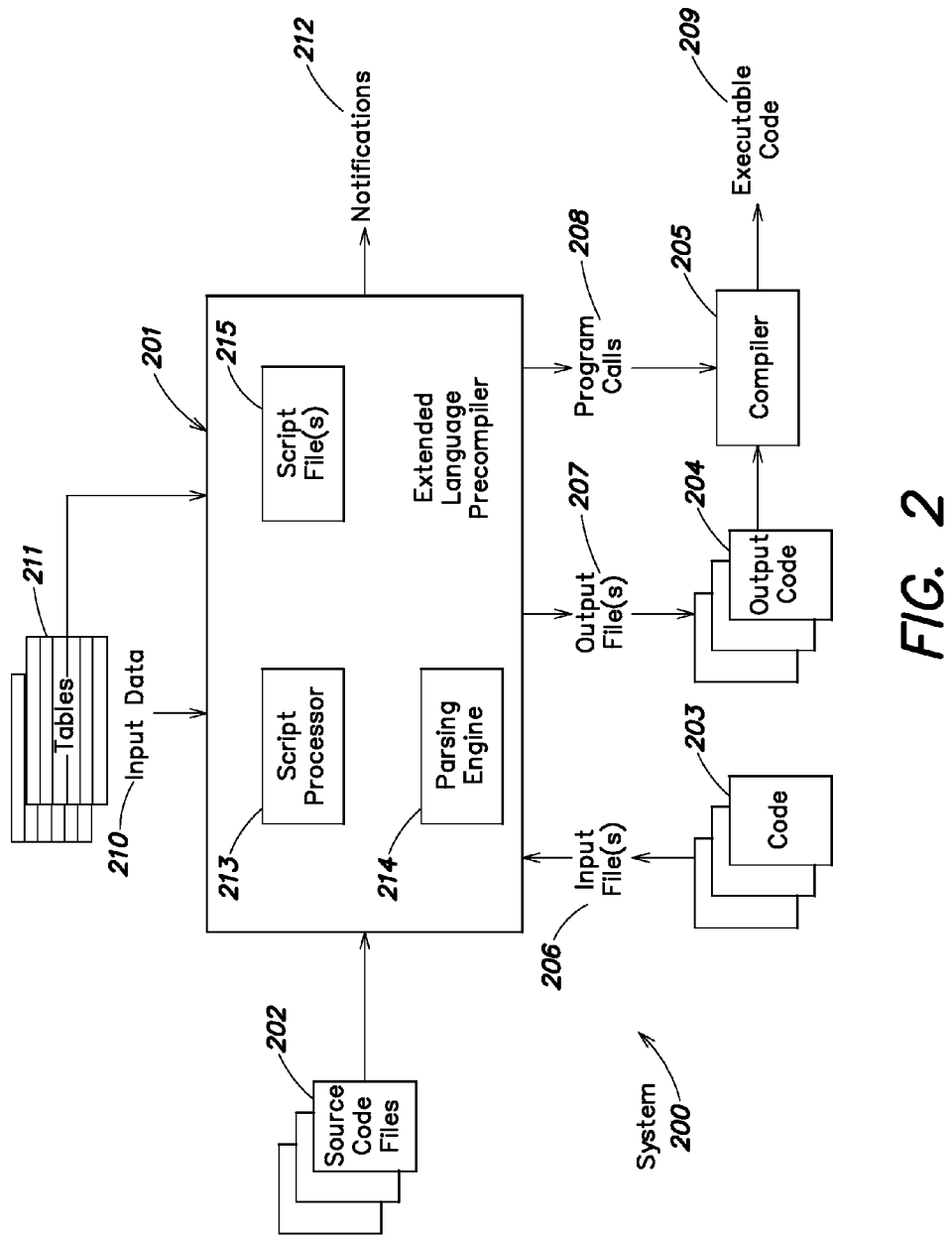
FIG. 2 shows another embodiment of a system for processing source code according to various embodiments of the present invention.

FIG. 2 shows another embodiment of a system 200 that may be used to process code according to various embodiments of the present invention. In particular, an extended language precompiler 201 may be provided that includes one or more components. For example, extended language precompiler 201 may include a script processor 213 that is capable of processing one or more script files 215. ELP 201 may also include a parsing engine 214 which is capable of parsing one or more source code files 202. ELP 201 may also receive one or more input files 206. Such files may include for example, code 203 that may be inserted into one or more source code files 202.

Further, ELP tool one may receive one or more input data elements (e.g., input data 210). For instance, ELP 201 may be capable of integrating one or more data sources into source code. For instance, a precompiler may be provided that recognizes and external access to data and prior to compile time, replaces such access to external data sources by code which accesses the data in a standard way (and without the necessity of human intervention of a programmer). In one implementation, a reference to external data tables (e.g., tables 211 within a source code program may, when processed, cause ELP 201 to replace such a reference with code used to access such tables from the external source that may be compiled within the language of the source code. Other external data accesses are possible and can be replaced by code prior to compilation.

ELP 201 may generate one or more output files 207 responsive to the processing performed. For instance, output files 207 may include output code 204 that may be derived at least in part by code 203, code 203, input data 210, and any other inputs accessed by ELP 201. Such output code 204 may be sent to a compiler 205 that is adapted to compile the program and produce executable code (e.g., executable code 209). In another embodiment, the source code may be programmed in an interpreted language, scripting language or other language type and executed directly.

Further, ELP 201 may be configured to call external programs to perform processing on the output code (or source code, if necessary), such as a call to a compiler program. Other program calls may be made by ELP 201 for the purpose of analyzing, modifying, or performing other actions with respect to the code. Similar to ELP 101, ELP 201 may be capable of generating one or more notifications (e.g., notifications 212) including information regarding the code or its processing.

Figure 3:
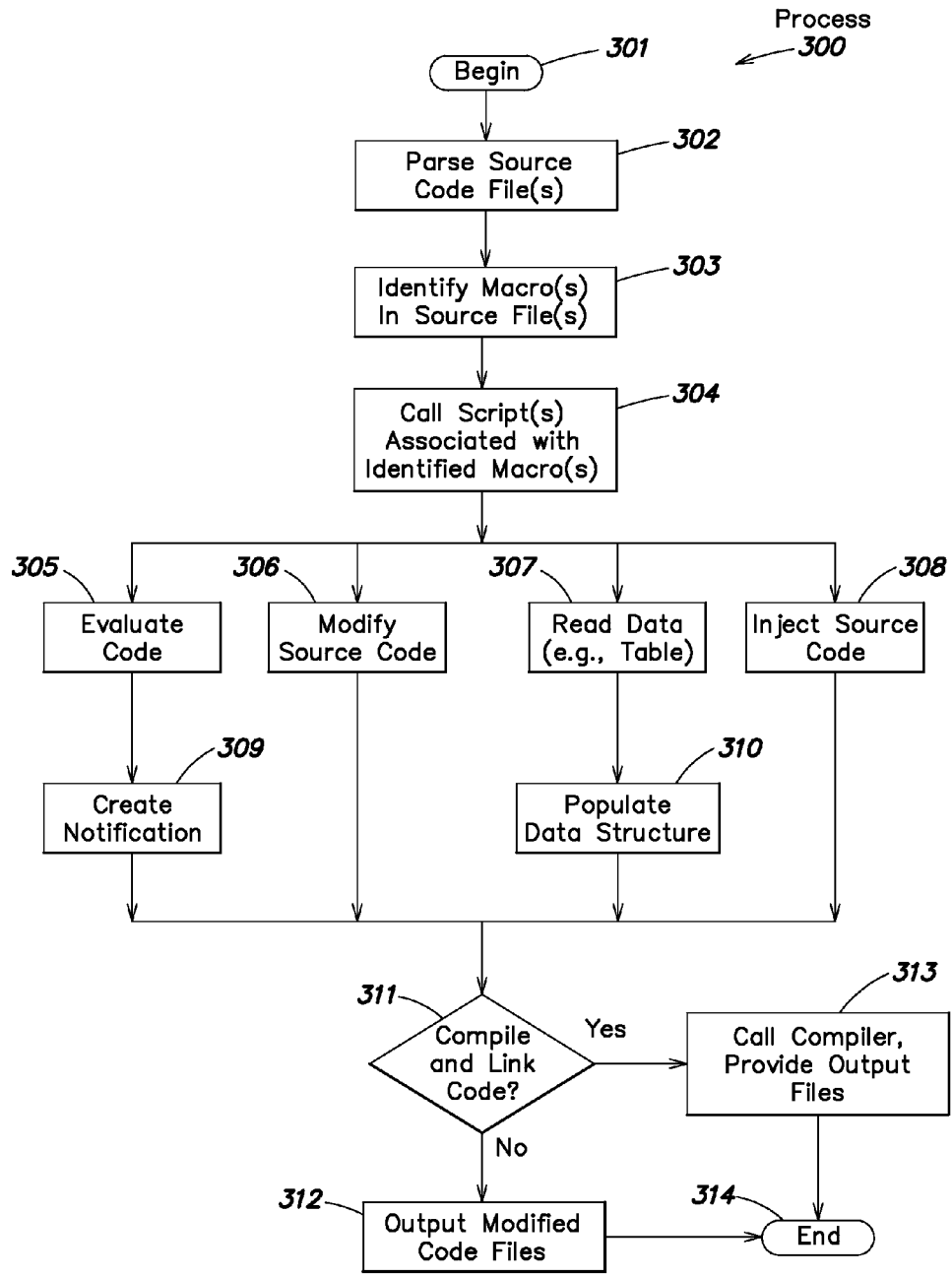
FIG. 3 shows a process for processing source code according to various embodiments of the present invention.

FIG. 3 shows a process 300 for processing source code according to various embodiments of the present invention. At block 301, process 300 begins. At block 302, the precompiler processes one or more source code files. At block 303, a parser identifies one or more macro(s) or tags within the source code files. At block 304, ELP calls one or more scripts associated with the identified macro(s) or tags.

Depending on the action required, the ELP will execute a script that evaluates code (e.g., at block 305), modifies one of more source code files (e.g., at block 306), reads data from an external source (e.g., reading data from a table at block 307), or inject source code into the original source (e.g., at block 308). Notably, the action that is performed by the ELP is user-configurable, as scripts may be written by the user which control how the source code is processed.

At block 309, if the code is evaluated, a notification may be created that identifies to the user, system or other entity that there are some issues with the code that need to be addressed, that the code was processed, or other informational message that relates to processing of the code. Optionally, if an external data source was accessed by the ELP, references to external data sources may be replaced by code, and commands that populate a data structure may be performed at block 310.

At block 311, the ELP may optionally call a compiler program and link code with the original source. If so, at block 313 the ELP may make an external program call to a compiler that is adapted to compile the language of the source code and may provide one or more output files that can be executed. In one embodiment, the ELP automatically calls the compiler program. Optionally, the ELP may output any modified source code files as result of any processing performed at block 312. At block 314, process 300 ends.

According to one embodiment of the present invention, some aspects described herein provide the ability to scan source code to evaluate code syntax, efficiency, keywords and other information and permit modification of the original code prior to being compiled into machine language. One advantage includes that the system is very flexible in that users are permitted to setup and manage modification of codes using macro commands, tags or other information within the source code.

Going to another embodiment, use of the precompiler simplifies implementation of internally written routines and third-party products by providing a common interface (e.g., by providing standard macro commands) to these components and automatically injecting any necessary code.

According to one embodiment, it is appreciated that aspects of the present invention may be used to scan and evaluate COBOL code. For instance, a precompiler may be used to scan COBOL code to evaluate its syntax and overall performance. For instance, by using a scripting language, the user may modify the code automatically to improve performance, replace standard instructions or report deviance is back to a developer. Another advantage includes, by using a generic parsing engine, any language or text values may be evaluated. In one implementation, the generic parsing engine may be used to parse the scripting language, COBOL code and macro commands defined within the source code.

EXAMPLES

The following is an example processing that shows various aspects of the present invention. The example used is a COBOL code example, but it should be appreciated that any high-level language may be processed using various precompilers according to various embodiments of the invention. In a short example, the original code for a source code file may be as follows:

Original Source Code:

```
*----------------------------------------------------------------
   WORKING-STORAGE SECTION.
*----------------------------------------------------------------
01 WS-JOBNAME              PIC X(08).
01 WS-JOBSTEP              PIC X(08).
01 WS-PROCNAME             PIC X(08).
01 WS-PROCSTEP             PIC X(08).
01 WS-JOBNBR               PIC X(08).
01 WS-USERID               PIC X(08).
01 WS-JOBSTARTDATE         PIC X(08).
01 WS-JOBSTARTTIME         PIC X(08).
01 WS-STEPSTARTDATE        PIC X(08).
01 WS-STEPSTARTTIME        PIC X(08).
01 WS-SYSPLEX              PIC X(04).
01 WS-SYSTEM               PIC X(04).
01 WS-QNAME                PIC X(04).
PROCEDURE DIVISION.
****************************************************************
*                                                              *
****************************************************************
A100-INIT-PROGRAM.
   EXEC ELP JOBINFO
      JOBNAME         ( WS-JOBNAME )
      STEPNAME        ( WS-JOBSTEP )
      PROCNAME        ( WS-PROCNAME )
      PROCSTEP        ( WS-PROCSTEP )
      JOBNUMBER       ( WS-JOBNBR )
```

Original Source Code:

```
      USERID          ( WS-USERID )
      JOBSTARTDATE    ( WS-JOBSTARTDATE )
      JOBSTARTTIME    ( WS-JOBSTARTTIME )
      STEPSTARTDATE   ( WS-STEPSTARTDATE )
      STEPSTARTTIME   ( WS-STEPSTARTTIME )
      SYSPLEX         ( WS-SYSPLEX )
      SYSTEMNAME      ( WS-SYSTEM )
      QNAME           ( WS-QNAME )
   END-EXEC.
A100-EXIT.
   EXIT.
```

In the procedure section of the COBOL example, the source file includes a reference to an ELP macro that refers to a procedure "JOBINFO." An ELP parser identifies the "EXEC ELP JOBINFO" tag and performs processing of the code area delineated by the tags and performs a code injection to the source code. The modified code as injected by an ELP process prior to compiling the program may be produced as follows:

Modified Code (injected by ELP process prior to compiling the program), wherein additional code may be inserted into different code sections as follows:

```
*----------------------------------------------------------------
   WORKING-STORAGE SECTION.
*----------------------------------------------------------------
01  WS-JOBNAME                          PIC X(08).
01  WS-JOBSTEP                          PIC X(08).
01  WS-PROCNAME                         PIC X(08).
01  WS-PROCSTEP                         PIC X(08).
01  WS-JOBNBR                           PIC X(08).
01  WS-USERID                           PIC X(08).
01  WS-JOBSTARTDATE                     PIC X(08).
01  WS-JOBSTARTTIME                     PIC X(08).
01  WS-STEPSTARTDATE                    PIC X(08).
01  WS-STEPSTARTTIME                    PIC X(08).
01  WS-SYSPLEX                          PIC X(04).
01  WS-SYSTEM                           PIC X(04).
01  WS-QNAME                            PIC X(04).
01  ELP-JOBINFO-DATA.                                     JOBINFO
COPY WMJOBC.
01  ELPN-JOBINFO-ASASYMBM-DATA.                           JOBINFO
    05 ELPN-JOBINFO-SYSPLEX             PIC X(04).        JOBINFO
    05 ELPN-JOBINFO-SYSNAME             PIC X(04).        JOBINFO
    05 ELPN-JOBINFO-QNAME               PIC X(04).        JOBINFO
    05 ELPN-JOBINFO-ASASYMBM-RC         PIC 9(09) COMP.   JOBINFO
01  WS-ELPN-ONE-TIME-INIT PIC X(01)        VALUE 'N'.     COBOLV41
    88 WS-ELPN-PROGRAM-INIT                VALUE 'Y'.     COBOLV41
    88 WS-ELPN-PROGRAM-NOT-INIT            VALUE 'N'.     COBOLV41
PROCEDURE DIVISION.
    IF WS-ELPN-PROGRAM-NOT-INIT
       SET WS-ELPN-PROGRAM-INIT TO TRUE
       PERFORM Y999-ELP-PGM-INITIALIZE THRU Y999-EXIT
    END-IF.
****************************************************************
*                                                              *
****************************************************************
A100-INIT-PROGRAM.
*    EXEC ELP JOBINFO
*       JOBNAME        (WS-JOBNAME)
*       STEPNAME       (WS-JOBSTEP)
*       PROCNAME       (WS-PROCNAME)
*       PROCSTEP       (WS-PROCSTEP)
*       JOBNUMBER      (WS-JOBNBR)
*       USERID         (WS-USERID)
*       JOBSTARTDATE   (WS-JOBSTARTDATE)
*       JOBSTARTTIME   (WS-JOBSTARTTIME)
*       STEPSTARTDATE  (WS-STEPSTARTDATE)
*       STEPSTARTTIME  (WS-STEPSTARTTIME)
*       SYSPLEX        (WS-SYSPLEX)
```

```
*       SYSTEMNAME       (WS-SYSTEM)
*       QNAME            (WS-QNAME)
*    END-EXEC.
     MOVE WMJI-JOB-NAME          TO WS-JOBNAME.         JOBINFO
     MOVE WMJI-JOB-NUMBER        TO WS-JOBNBR.          JOBINFO
     MOVE WMJI-JOB-STEP          TO WS-JOBSTEP.         JOBINFO
     MOVE WMJI-PROC-NAME         TO WS-PROCNAME.        JOBINFO
     MOVE WMJI-PROC-STEP         TO WS-PROCSTEP.        JOBINFO
     MOVE WMJI-USER-ID           TO WS-USERID.          JOBINFO
     MOVE WMJI-JOB-START-DATE    TO WS-JOBSTARTDATE.    JOBINFO
     MOVE WMJI-JOB-START-TIME    TO WS-JOBSTARTTIME.    JOBINFO
     MOVE WMJI-STEP-START-DATE   TO WS-STEPSTARTDATE.   JOBINFO
     MOVE WMJI-STEP-START-TIME   TO WS-STEPSTARTTIME.   JOBINFO
     MOVE ELPN-JOBINFO-SYSPLEX    TO WS-SYSPLEX.        JOBINFO
     MOVE ELPN-JOBINFO-SYSNAME    TO WS-SYSTEM.         JOBINFO
     MOVE ELPN-JOBINFO-QNAME      TO WS-QNAME.          JOBINFO
A100-EXIT.
     EXIT.
Y999-ELP-PGM-INITIALIZE.                                COBOLV41
     CALL 'WMJOBI' USING ELP-JOBINFO-DATA.              JOBINFO
     CALL 'ASASYMBM' USING                              JOBINFO
        BY CONTENT '&SYSPLEX.&SYSNAME.&MQSERIES.'       JOBINFO
        BY VALUE 28                                     JOBINFO
        BY REFERENCE ELPN-JOBINFO-ASASYMBM-DATA         JOBINFO
        BY CONTENT LENGTH OF ELPN-JOBINFO-ASASYMBM-DATA JOBINFO
        BY REFERENCE OMITTED                            JOBINFO
        BY REFERENCE OMITTED                            JOBINFO
        BY REFERENCE ELPN-JOBINFO-ASASYMBM-RC.          JOBINFO
Y999-EXIT.                                              COBOLV41
     EXIT.                                              COBOLV41
```

As shown, the script parses the program, inserts move variables and initialize the program. The script may also automatically verify the code (and any modified code) to ensure the code is in the proper format (e.g., COBOL format). According to one embodiment of the present invention, the scripting language that is used to identify portions of the source code to process and perform the processing may be any language. For instance, in one embodiment, the language may be C-like in its command structure, data formats and operation for ease of use.

In another example, the script is programmed to substitute code to perform array operations (e.g., ADDROW and SORT operations) as shown below:

Original Source Code:

```
*-----------------------------------------------------------
   WORKING-STORAGE SECTION.
*-----------------------------------------------------------
01 WS-TOTAL-ACCT          PIC 9(09) COMP VALUE 0.
01 WS-DISPLAY-LINE.
   05 WS-DIS-ACCT-NBR     PIC ZZZZZ9.
   05 FILLER              PIC X(02) VALUE SPACES.
   05 WS-DIS-ACCT-TYPE    PIC X(02).
   05 FILLER              PIC X(02) VALUE SPACES.
   05 WS-DIS-START        PIC ZZZZZZ9.
   05 FILLER              PIC X(02) VALUE SPACES.
   05 WS-DIS-END          PIC ZZZZZZ9.
   05 FILLER              PIC X(02) VALUE SPACES.
   05 WS-DIS-DEPT-NBR     PIC ZZZ9.
*-----------------------------------------------------------
*   FLAGS.
*-----------------------------------------------------------
*-----------------------------------------------------------
*   COPYBOOKS . . .
*-----------------------------------------------------------
   EXEC SQL INCLUDE SQLCA END-EXEC.
   EXEC SQL INCLUDE S0416100 END-EXEC.
*-----------------------------------------------------------
```

Original Source Code:

```
*   INTERNAL TABLES
*-----------------------------------------------------------
01 WS-ACCOUNTS.
   05 WS-ACCOUNT-ENTRY OCCURS 100 TIMES
                                 DEPENDING ON WS-TOTAL-ACCT
                                 ASCENDING KEY IS WS-ACCT-NBR
                                 INDEXED BY SB-ACCT-IDX.
      10 WS-ACCT-NBR              PIC 9(09) COMP.
      10 WS-ACCT-TYPE             PIC X(02).
      10 WS-START-LINECODE        PIC S9(09) COMP.
      10 WS-END-LINECODE          PIC S9(09) COMP.
      10 WS-DEPT-NBR              PIC S9(04) COMP.
      10 WS-COST-AMT-IND          PIC X(01).
      10 WS-RETAIL-AMT-IND        PIC X(01).
      10 WS-FOUND                 PIC X(01).
*-----------------------------------------------------------
*   SUBSCRIPTS OR INDEXES
*-----------------------------------------------------------
*-----------------------------------------------------------
*   CONSTANTS - EXTERNALIZED
*-----------------------------------------------------------
*-----------------------------------------------------------
*   CONSTANTS - NON-EXTERNALIZED
*-----------------------------------------------------------
*-----------------------------------------------------------
   LINKAGE SECTION.
*-----------------------------------------------------------
   EXEC SQL DECLARE ACCT_LIST CURSOR FOR
      SELECT DISTINCT ACCT_LEVEL_ID,
             ACCT_LEVEL_TYPE,
             START_LINECODE_NBR,
             END_LINECODE_NBR,
             DEPT_NBR,
             JRNL_COST_AMT_IND,
             JRNL_RTL_AMT_IND
      FROM XX_YY_ZZ
      WHERE OPER_ENTITY_CODE = 1
      ORDER BY ACCT_LEVEL_ID
      WITH UR
   END-EXEC.
*-----------------------------------------------------------
```

Original Source Code:

```
    PROCEDURE DIVISION.
*---------------------------------------------------------------
    PERFORM A100-INIT-PROGRAM THRU A100-EXIT.
    PERFORM B100-PROCESS-INPUT-RECORDS THRU B100-EXIT
       UNTIL SQLCODE NOT = 0.
    PERFORM B200-EXAMPLE-ARRAY-SORT THRU B200-EXIT.
    PERFORM C100-ALL-DONE THRU C100-EXIT.
    GOBACK.
**************************************************************
*                                                              *
**************************************************************
A100-INIT-PROGRAM.
    EXEC SQL OPEN ACCT_LIST
    END-EXEC.
    IF SQLCODE NOT = 0
       DISPLAY 'OPEN SQLCODE=' SQLCODE
       GOBACK
    END-IF.
    PERFORM D100-FETCH-CURSOR THRU D100-EXIT.
A100-EXIT.
    EXIT.
**************************************************************
*   LOAD THE INTERNAL ARRAY WITH ALL NON-STORE                *
*   AND ACCOUNT RELATED SELECTION ELEMENTS                    *
**************************************************************
B100-PROCESS-INPUT-RECORDS.
*   *---------------------------------------------------------*
*   * ADDS ROWS AS NEEDED TO THE ARRAY.                       *
*   * THIS AUTOMATICALLY INCREMENTS THE                       *
*   * DEPENDING ON VARIABLE, WS-TOTAL-ACCT.                   *
*   *---------------------------------------------------------*
    EXEC ELP ARRAY ADDROW
         STRUCT( WS-ACCOUNTS )
    END-EXEC.
    SET SB-ACCT-IDX                TO WS-TOTAL-ACCT.
    MOVE ACCT-LEVEL-ID             TO
         WS-ACCT-NBR(SB-ACCT-IDX).
    MOVE ACCT-LEVEL-TYPE           TO
         WS-ACCT-TYPE(SB-ACCT-IDX).
    MOVE START-LINECODE-NBR        TO
         WS-START-LINECODE(SB-ACCT-IDX).
    MOVE END-LINECODE-NBR          TO
         WS-END-LINECODE(SB-ACCT-IDX).
    MOVE DEPT-NBR                  TO
         WS-DEPT-NBR(SB-ACCT-IDX).
    MOVE JRNL-COST-AMT-IND         TO
         WS-COST-AMT-IND(SB-ACCT-IDX).
    MOVE JRNL-RTL-AMT-IND          TO
         WS-RETAIL-AMT-IND(SB-ACCT-IDX).
    MOVE 'Y'                       TO
         WS-FOUND(SB-ACCT-IDX).
    PERFORM D100-FETCH-CURSOR THRU D100-EXIT.
B100-EXIT.
    EXIT.
**************************************************************
*                                                              *
**************************************************************
B200-EXAMPLE-ARRAY-SORT.
    DISPLAY 'ACCOUNT LIST AFTER INITIAL LOAD.'
    PERFORM D200-DISPLAY-ACCOUNTS THRU D200-EXIT.
    EXEC ELP ARRAY SORT
       STRUCT( WS-ACCOUNTS )
       COLUMN( WS-START-LINECODE )
       COLUMN( WS-END-LINECODE )
    END-EXEC.
    DISPLAY ' '.
    DISPLAY 'ACCOUNT LIST AFTER SORTING BY: START-
       LINECODE '
          'AND END-LINECODE.'
    PERFORM D200-DISPLAY-ACCOUNTS THRU D200-EXIT.
    EXEC ELP ARRAY SORT
       STRUCT( WS-ACCOUNTS )
       COLUMN( WS-DEPT-NBR )
       COLUMN( WS-ACCT-NBR )
    END-EXEC.
    DISPLAY ' '.
```

Original Source Code:

```
    DISPLAY 'ACCOUNT LIST AFTER SORTING BY: DEPT-NBR '
       'AND ACCT-NBR.'
    PERFORM D200-DISPLAY-ACCOUNTS THRU D200-EXIT.
B200-EXIT.
    EXIT.
**************************************************************
*                                                              *
**************************************************************
C100-ALL-DONE.
    EXEC SQL CLOSE ACCT_LIST
    END-EXEC.
    IF SQLCODE NOT = 0
       DISPLAY 'CLOSE SQLCODE=' SQLCODE
       GOBACK
    END-IF.
    DISPLAY 'TOTAL ACCOUNTS LOADED: ' WS-TOTAL-ACCT.
C100-EXIT.
    EXIT.
**************************************************************
*                                                              *
**************************************************************
D100-FETCH-CURSOR.
    EXEC SQL FETCH ACCT_LIST
       INTO :ACCT-LEVEL-ID,
            :ACCT-LEVEL-TYPE,
            :START-LINECODE-NBR,
            :END-LINECODE-NBR,
            :DEPT-NBR,
            :JRNL-COST-AMT-IND,
            :JRNL-RTL-AMT-IND
    END-EXEC.
D100-EXIT.
    EXIT.
```

```
**************************************************************
*                                                              *
**************************************************************
D200-DISPLAY-ACCOUNTS.
    PERFORM VARYING SB-ACCT-IDX FROM 1 BY 1
       UNTIL SB-ACCT-IDX > WS-TOTAL-ACCT
       MOVE WS-ACCT-NBR(SB-ACCT-IDX)          TO
            WS-DIS-ACCT-NBR
       MOVE WS-ACCT-TYPE(SB-ACCT-IDX)         TO
            WS-DIS-ACCT-TYPE
       MOVE WS-START-LINECODE(SB-ACCT-IDX)    TO
            WS-DIS-START
       MOVE WS-END-LINECODE(SB-ACCT-IDX)      TO
            WS-DIS-END
       MOVE WS-DEPT-NBR(SB-ACCT-IDX)          TO
            WS-DIS-DEPT-NBR
       DISPLAY WS-DISPLAY-LINE
    END-PERFORM.
D200-EXIT.
    EXIT.
```

According to various embodiments, the modified source code as a result of ELP processing may be as appearing in the attached Source Code which forms an integral part of the instant application.

According to another embodiment, it is appreciated that conventional procedures and methods (e.g., a "read" command or "write" command) within a particular source code file may be replaced by the script processor to insert replacement code for particular sections (e.g., particular commands). For instance, it may be desired that a read or write command may have a particular format (or provide a certain behavior) that is different from the standard "read" and "write" commands. For example, it may be desired that the "read" and "write" commands access a new data structure type or location, or interact with a particular external system.

The script processor may process a script program (e.g., one provided by a programmer) that replaces all instances of the commands within the source with the "replaced" commands that access the new data structure or external system. Notably, because the preprocessor modifies the source code and checks the source code prior to the code being compiled, the need for the programmer to recode and test all of the source code is removed, and the programming time is drastically reduced. It should be appreciated (especially in the COBOL programming area) where there are existing source programs that are reused but yet need to be modified to support new functionality, that the cost for upgrading such legacy code is cost prohibitive due to the amount of programmer labor, checking and retest required. To this end, and ELP that makes it easier to rewrite and verify existing code to support additional features without excessive programmer coding and retest would be beneficial, and therefore the ELP would be a powerful programming tool for manipulating code automatically.

Below is one example of a script that may be used to substitute open, close, read and write commands in COBOL source code:

```
*************************************************************
PARM elpscript astScript
PARM string asEventName
TriggerELPOnEvent( 'COBOL_EXTRACT:BEFORE',
                  'WMIO_SetupFileVerions',
                  astScript )
TriggerELPOnEvent( 'COBOL_EXTRACT:AFTER',
                  'WMIO_ConvertFiles',
                  astScript,
                  LAST )
return
include CPYBKIOS
*************************************************************
* Function: WMIO_SetupFileVerions
*   Sets a lines include value to true or false.
*---------------------------------------------------------------
*
*************************************************************
int WMIO_SetupFileVerions( elpscript astScript, string asEvent )
    element lstElement
    string lsName, lsVersion
    for each lstElement in astScript.Elements
        if lstElement.Type = 'VARIABLE'
            select lstElement.Name
                case '@FILENAME'
                    lsName = 'WMIO:FILE:' + lstElement.Value
                case '@COPYBOOK'
                    lsName = 'WMIO:COPYBOOK:' + lstElement.Value
                case '@FILEVERSION'
                case '@FILE_MIN'
                case '@FILE_MAX'
                    lsVersion = lstElement.Value
                    ListAdd( GLOBAL, lsVersion, lsName )
            end-select
        end-if
    next
    return
*************************************************************
* Function: WMIO_ConvertFiles
* Primary script for WMIO COBOL program processing. The purpose
* of this script is to convert COBOL OPEN, READ, WRITE and
* CLOSE statements over to use the 'WMIO' read/write routine.
* This makes the file IO more flexible and allows us to make
* large changes to files in many programs over a period of time
* compared to a "Big Bang" install approach that is required today.
* The WMIO routines are all based on COPYBOOKs. So when a
* copybook is used to read/write to a file or IMS table it can be
* converted to run through WMIO to perform the data conversions.
* This script looks for three main things to determine if it
* can convert over to the WMIO routines.
*    1) Any COPYBOOKS located in the FD section.
*    2) READ INTO statements that reference variables located in
*       a COPYBOOK.
*    3) CALL statements that reference QUICKSAM or 'DFHEI1' that
*       also reference variables located in a COPYBOOK.
* This 'gstProgramInfo' variable is globally defined by COBOLV41
* and the structure is located in COB41STR.
*---------------------------------------------------------------
*
*************************************************************
int WMIO_ConvertFiles( elpscript astScript, string asEvent )
    struct WMIO_Info
    {
        list                   LookUpList
        struct COBOL_Program   PgmInfo
    }
    struct WMIO_Info              lstWMIO
    elpscript                     lstELPScript
    parseresult                   lstParseInfo
    struct COBOL_Instruction      lstInstr
    struct COBOL_Program          lstPgm
    struct COBOL_Source           lstCSource, lstCSourceEnd
    struct ELP:COPYBOOK_IO        lstCopybookIO
    list                          llInstrs, llInstr2, llFind
    lstWMIO.PgmInfo = GETPGMI( )
    lstPgm = lstWMIO.PgmInfo
    lstParseInfo = lstPgm.ParseResults
    if astScript.ParseErrors = TRUE
        ELPHEAD( astScript, 'Walmart Input/Output Conversion' )
        ELPPRTER( astScript )
        exit 8
    end-if
    :PrintWMIOInformation( astScript )
    ELPCMTLN( astScript, '' )
*   DBGAREA( area_findbytypename('PG','B110-READ-LOCK-F3A'))
*   DBGAREA( area_findbytypename('PG','D200-UPDATE-F3A-
    SEGMENT'))
*************************************************************
*** Walk each instruction looking for READ,WRITE and CALL statements.
*************************************************************
*   for each llInstrs in lstPgm._Instructions
    for each llInstrs in Area_GetAreaSources( Area_FindByType( 'PD' ) )
        lstCSource = llInstrs.Item
        for each llInstr2 in lstCSource.Instruction
            lstInstr = llInstr2.item
            select lstInstr.Command
                case 'READ'
                    for each lstELPScript in lstParseInfo.ELPScripts
                        if lstELPScript.Name = 'COPYBOOK_IO'
                            llFind = ListFind( GLOBAL, 'COPYBOOK_IO:' + lstELPScript.UniqID )
                            lstCopybookIO = llFind.Item
                            COBWMIOR( lstInstr, lstwMIO, lstCopybookIO )
                        end-if
                    next
                case 'WRITE'
                    for each lstELPScript in lstParseInfo.ELPScripts
                        if lstELPScript.Name = 'COPYBOOK_IO'
                            llFind = ListFind( GLOBAL, 'COPYBOOK_IO:' + lstELPScript.UniqID )
                            lstCopybookIO = llFind.Item
                            COBWMIOW( lstInstr, lstWMIO, lstCopybookIO )
                        end-if
                    next
                case 'CALL'
                    for each lstELPScript in lstParseInfo.ELPScripts
                        if lstELPScript.Name = 'COPYBOOK_IO'
                            llFind = ListFind( GLOBAL, 'COPYBOOK_IO:' + lstELPScript.UniqID )
                            lstCopybookIO = llFind.Item
                            if COBWMIOC( lstInstr,
                                         lstWMIO,
                                         lstCopybookIO,
                                         lstCSource ) = TRUE
                                if llInstrs.Next < > NULLS
                                    llFind = llInstrs.Next
                                    lstCSourceEnd = llFind.Item
                                    if lstCSourceEnd.Command = 'END-CALL'
                                        lstCSourceEnd.CommentedOut = TRUE
                                        lstCSourceEnd.Modified = TRUE
                                        lstCSourceEnd.ModifyTag = 'WMIO'
                                    end-if
```

```
            end-if
          exit
        end-if
      end-if
    next
  end-select
  next
next
return
***********************************************************
* Function: :PrintWMIOInformation
*---------------------------------------------------------------------------
*
***********************************************************
int :PrintWMIOInformation( elpscript astScript )
  list llFind, llItem
  string lsDDName, lsVersion
  ELPHEAD( astScript, 'Walmart Input/Output Conversion' )
  print 'WMIO activated for this program.'
  *---------------------------------------------------------------------------
  * Walk through the GLOBAL list entries (basically
  * global variables) to get the COMPILE VARIABLES
  * to substitue in the strings loaded from the
  * profile data
  *---------------------------------------------------------------------------
  llFind = ListFind( GLOBAL )
  for each llItem in llFind
    if left( llItem.Key, 10 ) = 'WMIO:FILE:'
      lsDDName = substr( llItem.Key, 11 )
      lsVersion = llItem.Item
      print 'Overriding FD file ' + lsDDName +
            ' to version ' + lsVersion
    end-if
    if left( llItem.Key, 14 ) = 'WMIO:COPYBOOK:'
      lsDDName = substr( llItem.Key, 15 )
      lsversion = llItem.Item
      print 'Overriding COPYBOOK ' + lsDDName +
            ' to version ' + lsVersion
    end-if
  next
  return
include COBWMIOX
The copybooks code may be for example:
      EXEC ELP COPYBOOK_IO
          WRITE_VERSION ( 1 )
          FILE_VERSION ( 1 , LRECL , :06A:-RECORD )
      01  :06A:-RECORD.
          05 :06A:-FLD-01        PIC S9(01).
          05 :06A:-FLD-02        PIC 9(02).
          05 :06A:-FLD-03        PIC S9(03).
          05 :06A:-FLD-04        PIC 9(04).
          05 :06A:-FLD-05        PIC S9(05).
          05 :06A:-FLD-06        PIC 9(06).
          05 :06A:-FLD-07        PIC S9(07).
          05 :06A:-FLD-08        PIC 9(08).
          05 :06A:-FLD-09        PIC S9(09).
          05 :06A:-FLD-10        PIC 9(10).
          05 :06A:-FLD-11        PIC S9(11).
          05 :06A:-FLD-12        PIC 9(12).
          05 :06A:-FLD-13        PIC S9(13).
          05 :06A:-FLD-14        PIC 9(14).
          05 :06A:-FLD-15        PIC S9(15).
          05 :06A:-FLD-16        PIC 9(16).
          05 :06A:-FLD-17        PIC S9(17).
          05 :06A:-FLD-18        PIC 9(18).
          05 :06A:-FLD-19        PIC S9(19).
          05 :06A:-FLD-20        PIC 9(20).
          05 :06A:-FLD-21        PIC S9(21).
          05 :06A:-FLD-22        PIC 9(22).
          05 :06A:-FLD-23        PIC S9(23).
          05 :06A:-FLD-24        PIC 9(24).
          05 :06A:-FLD-25        PIC S9(25).
          05 :06A:-FLD-26        PIC 9(26).
          05 :06A:-FLD-27        PIC S9(27).
          05 :06A:-FLD-28        PIC 9(28).
          05 :06A:-FLD-29        PIC S9(29).
          05 :06A:-FLD-30        PIC 9(30).
          05 :06A:-FLD-31        PIC S9(31).
          FILE_VERSION ( 2 , LRECL , :06A:-RECORD )
      01  :06A:-RECORD.
          05 :06A:-FLD-01        PIC S9(01) COMP-3.
          05 :06A:-FLD-02        PIC 9(02) COMP-3.
          05 :06A:-FLD-03        PIC S9(03) COMP-3.
          05 :06A:-FLD-04        PIC 9(04) COMP-3.
          05 :06A:-FLD-05        PIC S9(05) COMP-3.
          05 :06A:-FLD-06        PIC 9(06) COMP-3.
          05 :06A:-FLD-07        PIC S9(07) COMP-3.
          05 :06A:-FLD-08        PIC 9(08) COMP-3.
          05 :06A:-FLD-09        PIC S9(09) COMP-3.
          05 :06A:-FLD-10        PIC 9(10) COMP-3.
          05 :06A:-FLD-11        PIC S9(11) COMP-3.
          05 :06A:-FLD-12        PIC 9(12) COMP-3.
          05 :06A:-FLD-13        PIC S9(13) COMP-3.
          05 :06A:-FLD-14        PIC 9(14) COMP-3.
          05 :06A:-FLD-15        PIC S9(15) COMP-3.
          05 :06A:-FLD-16        PIC 9(16) COMP-3.
          05 :06A:-FLD-17        PIC S9(17) COMP-3.
          05 :06A:-FLD-18        PIC 9(18) COMP-3.
          05 :06A:-FLD-19        PIC S9(19) COMP-3.
          05 :06A:-FLD-20        PIC 9(20) COMP-3.
          05 :06A:-FLD-21        PIC S9(21) COMP-3.
          05 :06A:-FLD-22        PIC 9(22) COMP-3.
          05 :06A:-FLD-23        PIC S9(23) COMP-3.
          05 :06A:-FLD-24        PIC 9(24) COMP-3.
          05 :06A:-FLD-25        PIC S9(25) COMP-3.
          05 :06A:-FLD-26        PIC 9(26) COMP-3.
          05 :06A:-FLD-27        PIC S9(27) COMP-3.
          05 :06A:-FLD-28        PIC 9(28) COMP-3.
          05 :06A:-FLD-29        PIC S9(29) COMP-3.
          05 :06A:-FLD-30        PIC 9(30) COMP-3.
          05 :06A:-FLD-31        PIC S9(31) COMP-3.
      END-EXEC.
```

It should be appreciated that these code examples are merely implementations, and other uses and functions may be performed by an ELP according to various embodiments of the present invention. According to one embodiment, Example Computer Implementations Processes described above are merely illustrative embodiments of systems that may be used to process source code. Such illustrative embodiments are not intended to limit the scope of the present invention, as any of numerous other implementations for performing the invention. None of the claims set forth below are intended to be limited to any particular implementation of a source code processing system, unless such claim includes a limitation explicitly reciting a particular implementation.

Processes and methods associated with various embodiments, acts thereof and various embodiments and variations of these methods and acts, individually or in combination, may be defined by computer-readable signals tangibly embodied on a computer-readable medium, for example, a non-volatile recording medium, an integrated circuit memory element, or a combination thereof. According to one embodiment, the computer-readable medium may be non-transitory in that the computer-executable instructions may be stored permanently or semi-permanently on the medium. Such signals may define instructions, for example, as part of one or more programs, that, as a result of being executed by a computer, instruct the computer to perform one or more of the methods or acts described herein, and/or various embodiments, variations and combinations thereof. Such instructions may be written in any of a plurality of programming languages, for example, Java, Visual Basic, C, C#, or C++, Fortran, Pascal, Eiffel, Basic, COBOL, etc., or any of a variety of combinations thereof. The computer-readable medium on which such instructions are stored may reside on one or more of the components of a general-purpose computer described above, and may be distributed across one or more of such components.

The computer-readable medium may be transportable such that the instructions stored thereon can be loaded onto any computer system resource to implement the aspects of the present invention discussed herein. In addition, it should be appreciated that the instructions stored on the computer-readable medium, described above, are not limited to instructions embodied as part of an application program running on a host computer. Rather, the instructions may be embodied as any type of computer code (e.g., software or microcode) that can be employed to program a processor to implement the above-discussed aspects of the present invention.

Various embodiments according to the invention may be implemented on one or more computer systems. These computer systems may be, for example, general-purpose computers such as those based on Intel processor types, Motorola PowerPC, Sun UltraSPARC, Hewlett-Packard PA-RISC processors, ARM Cortex processor, Qualcomm Scorpion processor, or any other type of processor. It should be appreciated that one or more of any type computer system may be used to process source code according to various embodiments of the invention. Further, the software design system may be located on a single computer or may be distributed among a plurality of computers attached by a communications network.

The computer system may include specially-programmed, special-purpose hardware, for example, an application-specific integrated circuit (ASIC). Aspects of the invention may be implemented in software, hardware or firmware, or any combination thereof. Further, such methods, acts, systems, system elements and components thereof may be implemented as part of the computer system described above or as an independent component.

A computer system may be a general-purpose computer system that is programmable using a high-level computer programming language. Computer system may be also implemented using specially programmed, special purpose hardware. In a computer system there may be a processor that is typically a commercially available processor such as the well-known Pentium class processor available from the Intel Corporation. Many other processors are available. Such a processor usually executes an operating system which may be, for example, the Windows 7 or Windows 8 operating systems available from the Microsoft Corporation, MAC OS X Snow Leopard, MAC OS X Lion operating systems available from Apple Computer, iOS, Blackberry OS, Windows Mobile or Android OS operating systems, or UNIX available from various sources. Many other operating systems may be used.

Some aspects of the invention may be implemented as distributed application components that may be executed on a number of different types of systems coupled over a computer network. Some components may be located and executed on mobile devices, servers, tablets, or other system types. Other components of a distributed system may also be used, such as databases (e.g., the mongoDB database), cloud services, or other component types.

The processor and operating system together define a computer platform for which application programs in high-level programming languages are written. It should be understood that the invention is not limited to a particular computer system platform, processor, operating system, or network. Further, it should be appreciated that multiple computer platform types may be used in a distributed computer system that implement various aspects of the present invention. Also, it should be apparent to those skilled in the art that the present invention is not limited to a specific programming language or computer system. Further, it should be appreciated that other appropriate programming languages and other appropriate computer systems could also be used.

One or more portions of the computer system may be distributed across one or more computer systems coupled to a communications network. These computer systems also may be general-purpose computer systems. For example, various aspects of the invention may be distributed among one or more computer systems configured to provide a service (e.g., servers) to one or more client computers, or to perform an overall task as part of a distributed system. For example, various aspects of the invention may be performed on a client-server system that includes components distributed among one or more server systems that perform various functions according to various embodiments of the invention. These components may be executable, intermediate (e.g., IL) or interpreted (e.g., Java) code which communicate over a communication network (e.g., the Internet) using a communication protocol (e.g., TCP/IP). Certain aspects of the present invention may also be implemented on a cloud-based computer system (e.g., the EC2 cloud-based computing platform provided by Amazon.com), a distributed computer network including clients and servers, or any combination of systems.

It should be appreciated that the invention is not limited to executing on any particular system or group of systems. Also, it should be appreciated that the invention is not limited to any particular distributed architecture, network, or communication protocol.

Various embodiments of the present invention may be programmed using an object-oriented programming language, such as Java, C++, or C# (C-Sharp). Other object-oriented programming languages may also be used. Alternatively, functional, scripting, and/or logical programming languages may be used. Various aspects of the invention may be implemented in a non-programmed environment (e.g., documents created in HTML, XML or other format that, when viewed in a window of a browser program, render aspects of a graphical-user interface (GUI) or perform other functions). Various aspects of the invention may be implemented as programmed or non-programmed elements, or any combination thereof.

Further, on each of the one or more computer systems that include one or more components of distributed system 100, each of the components may reside in one or more locations on the system. For example, different portions of the components of system 100 may reside in different areas of memory (e.g., RAM, ROM, disk, etc.) on one or more computer systems. Each of such one or more computer systems may include, among other components, a plurality of known components such as one or more processors, a memory system, a disk storage system, one or more network interfaces, and one or more busses or other internal communication links interconnecting the various components.

Figure 4:
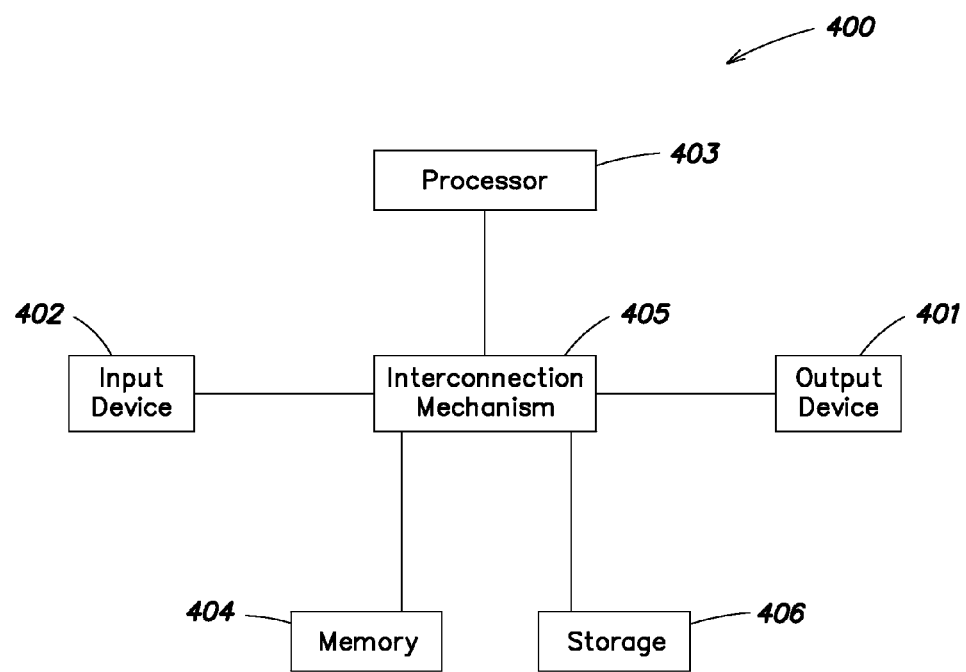
FIG. 4 shows an example computer system with which various aspects of the invention may be practiced.
Figure 5:
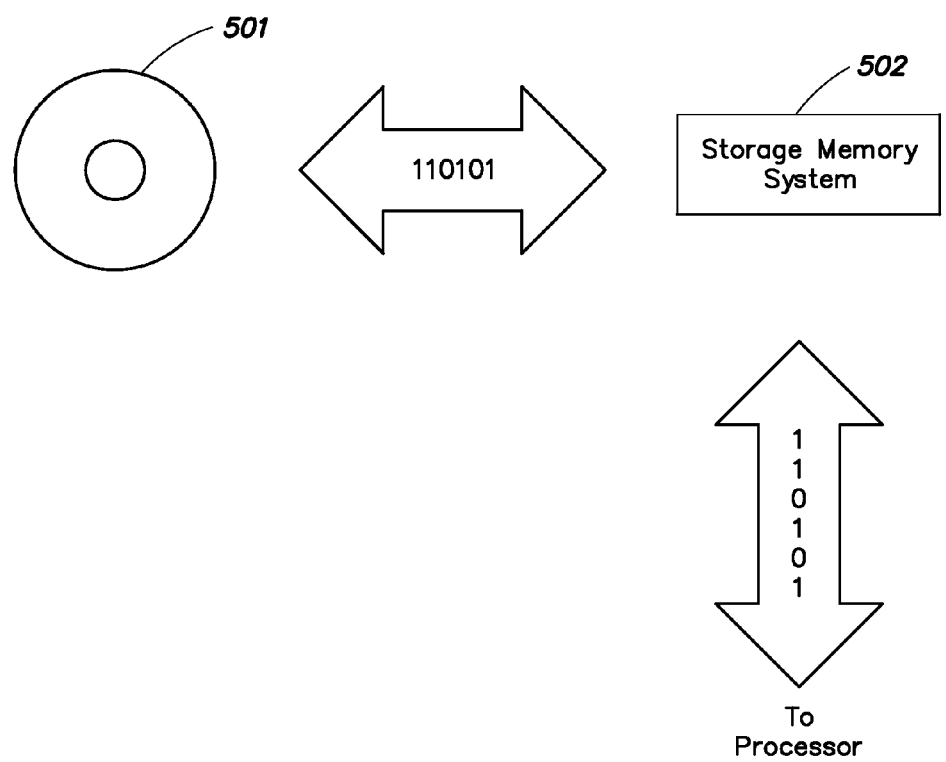
FIG. 5 shows an example storage system capable of implementing various aspects of the present invention.

Any number of systems of system 100 may be implemented on a computer system described below in relation to FIGS. 4 and 5. In particular, FIG. 4 shows an example computer system 400 used to implement various aspects. FIG. 5 shows an example storage system that may be used.

System 400 is merely an illustrative embodiment of a computer system suitable for implementing various aspects of the invention. Such an illustrative embodiment is not intended to limit the scope of the invention, as any of numerous other implementations of the system, for example, are possible and are intended to fall within the scope of the invention. For example, a virtual computing platform may be used. None of the claims set forth below are intended to be limited to any particular implementation of the system unless such claim includes a limitation explicitly reciting a particular implementation.

For example, various aspects of the invention may be implemented as specialized software executing in a general-purpose computer system 400 such as that shown in FIG. 5. The computer system 400 may include a processor 403 connected to one or more memory devices 404, such as a disk drive, memory, or other device for storing data. Memory 404 is typically used for storing programs and data during operation of the computer system 400. Components of computer system 400 may be coupled by an interconnection mechanism 405, which may include one or more busses (e.g., between components that are integrated within a same machine) and/or a network (e.g., between components that reside on separate discrete machines). The interconnection mechanism 405 enables communications (e.g., data, instructions) to be exchanged between system components of system 400. Computer system 400 also includes one or more input devices 402, for example, a keyboard, mouse, scanner, trackball, microphone, touch screen, and one or more output devices 401, for example, a printing device, display screen, and/or speaker. The system may also include any specialized components depending on the application, including any bar-code reader, magnetic stripe reader, receipt printer, hand-held or fixed scanners, pin entry devices (PED), or other device types. In addition, computer system 400 may contain one or more interfaces (not shown) that connect computer system 400 to a communication network (in addition or as an alternative to the interconnection mechanism 405).

The storage system 406, shown in greater detail in FIG. 6, typically includes a computer readable and writeable non-volatile recording medium 501 in which signals are stored that define a program to be executed by the processor or information stored on or in the medium 501 to be processed by the program. The medium may, for example, be a disk or flash memory. Typically, in operation, the processor causes data to be read from the nonvolatile recording medium 501 into another memory 502 that allows for faster access to the information by the processor than does the medium 501. This memory 502 is typically a volatile, random access memory such as a dynamic random access memory (DRAM) or static memory (SRAM). It may be located in storage system 406, as shown, or in memory system 404, not shown. The processor 403 generally manipulates the data within the integrated circuit memory 404, 502 and then copies the data to the medium 501 after processing is completed. A variety of mechanisms are known for managing data movement between the medium 501 and the integrated circuit memory element 404, 502, and the invention is not limited thereto. The invention is not limited to a particular memory system 404 or storage system 406.

The computer system may include specially-programmed, special-purpose hardware, for example, an application-specific integrated circuit (ASIC). Aspects of the invention may be implemented in software, hardware or firmware, or any combination thereof. Further, such methods, acts, systems, system elements and components thereof may be implemented as part of the computer system described above or as an independent component.

Although computer system 400 is shown by way of example as one type of computer system upon which various aspects of the invention may be practiced, it should be appreciated that aspects of the invention are not limited to being implemented on the computer system as shown in FIG. 5. Various aspects of the invention may be practiced on one or more computers having a different architecture or components that that shown in FIG. 5.

Computer system 400 may be a general-purpose computer system that is programmable using a high-level computer programming language. Computer system 400 may be also implemented using specially programmed, special purpose hardware. In computer system 400, processor 403 is typically a commercially available processor such as the well-known Pentium, Core, Core Vpro, Xeon, or Itanium class processors available from the Intel Corporation. Many other processors are available. Such a processor usually executes an operating system which may be, for example, the Windows 7 or Windows 8 operating systems available from the Microsoft Corporation, MAC OS Snow Leopard, MAC OS X Lion operating systems available from Apple Computer, the Solaris Operating System available from Sun Microsystems, iOS, Blackberry OS, Windows 7 or 8 Mobile or Android OS operating systems, or UNIX available from various sources. Further, mainframe systems commercially available from IBM may be used that execute one or more mainframe operating systems (e.g., z/OS). Many other system types and operating systems may be used.

The processor and operating system together define a computer platform for which application programs in high-level programming languages are written. It should be understood that the invention is not limited to a particular computer system platform, processor, operating system, or network. Also, it should be apparent to those skilled in the art that the present invention is not limited to a specific programming language or computer system. Further, it should be appreciated that other appropriate programming languages and other appropriate computer systems could also be used.

One or more portions of the computer system may be distributed across one or more computer systems (not shown) coupled to a communications network. These computer systems also may be general-purpose computer systems. For example, various aspects of the invention may be distributed among one or more computer systems configured to provide a service (e.g., servers) to one or more client computers, or to perform an overall task as part of a distributed system. For example, various aspects of the invention may be performed on a client-server system that includes components distributed among one or more server systems that perform various functions according to various embodiments of the invention. These components may be executable, intermediate (e.g., IL) or interpreted (e.g., Java) code which communicate over a communication network (e.g., the Internet) using a communication protocol (e.g., TCP/IP).

It should be appreciated that the invention is not limited to executing on any particular system or group of systems. Also, it should be appreciated that the invention is not limited to any particular distributed architecture, network, or communication protocol.

Various embodiments of the present invention may be programmed using an object-oriented programming language, such as Java, C++, or C# (C-Sharp). Other object-oriented programming languages may also be used. Alternatively, functional, scripting, and/or logical programming languages may be used. Various aspects of the invention may be implemented in a non-programmed environment (e.g., documents created in HTML, XML or other format that, when viewed in a window of a browser program, render aspects of a graphical-user interface (GUI) or perform other functions). Various aspects of the invention may be implemented using various Internet technologies such as, for example, the well-known Common Gateway Interface (CGI) script, PHP Hyper-text Preprocessor (PHP), Active Server Pages (ASP), HyperText Markup Language (HTML), Extensible Markup Language (XML), Java, JavaScript, Asynchronous JavaScript and XML (AJAX), Flash, and other programming methods. Further, various aspects of the present invention may be implemented in a cloud-based computing platform, such as the well-known EC2 platform available commercially from Amazon.com, Seattle, Wash., among others. Various aspects of the invention may be implemented as programmed or non-programmed elements, or any combination thereof.

Having thus described several aspects of at least one embodiment of this invention, it is to be appreciated various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

What is claimed is:

1. A system for processing source code, the system comprising:
   a parsing engine executed by special purpose hardware and stored in a memory in communication with the special purpose hardware, and configured to process at least one portion of source code, the parsing engine being configured to identify at least one macro element within the at least one portion of code; and
   a script executing engine executed by special purpose hardware and stored in a memory in communication with the special purpose hardware, and adapted to execute one or more scripts that are capable of performing one or more actions with respect to processing the source code prior to a compile action, the script engine performing the one or more actions responsive to the identification of the at least one macro element, wherein the one or more actions includes performing at least one program call of an outside program responsive to the identification of the at least one macro element.

2. The system according to claim 1, wherein the one or more actions includes modifying the at least one portion of source code responsive to the identification of the at least one macro element.

3. The system according to claim 1, wherein the one or more actions includes injecting code into the at least one portion of source code responsive to the identification of the at least one macro element.

4. The system according to claim 1, wherein the one or more actions includes performing an optimization of the at least one portion of source code responsive to the identification of the at least one macro element.

5. The system according to claim 1, the system being adapted to produce one or more portions of output source code.

6. The system according to claim 5, wherein the system is operable to compile the one or more portions of output source code.

7. The system according to claim 1, wherein the one or more actions includes modifying the at least one portion of source code to include program code to read input data, the input data being defined within a database separate from the at least one portion of source code.

8. The system according to claim 1, wherein the one or more actions includes sending a notification including information relative to a processing of the at least one portion of source code responsive to the identification of the at least one macro element.

9. The system according to claim 1, wherein at least one of the one or more scripts are provided by a programmer to selectively process the source code prior to the compile action.

10. The system according to claim 1, wherein the one or more actions includes replacing a standard programming operator within the at least one portion of source code with code associated with a custom operator.

11. A method for processing source code, the method comprising acts of:
   parsing at least one portion of source code, the act of parsing comprising an act of identifying at least one macro element within the at least one portion of code; and
   executing, responsive to the identification of the at least one macro element, one or more scripts that perform one or more actions with respect to processing the source code prior to a compile action, wherein the one or more actions includes an act of performing at least one program call of an outside program responsive to the identification of the at least one macro element.

12. The method according to claim 11, wherein the one or more actions includes an act of modifying the at least one portion of source code responsive to the identification of the at least one macro element.

13. The method according to claim 11, wherein the one or more actions includes an act of injecting code into the at least one portion of source code responsive to the identification of the at least one macro element.

14. The method according to claim 11, wherein the one or more actions includes an act of performing an optimization of the at least one portion of source code responsive to the identification of the at least one macro element.

15. The method according to claim 11, further comprising an act of producing one or more portions of output source code.

16. The method according to claim 15, further comprising an act of compiling the one or more portions of output source code.

17. The method according to claim 11, wherein the one or more actions includes an act of modifying the at least one portion of source code to include program code to read input data, the input data being defined within a database separate from the at least one portion of source code.

18. The method according to claim 11, wherein the one or more actions includes an act of sending a notification including information relative to a processing of the at least one portion of source code responsive to the identification of the at least one macro element.

19. The method according to claim 11, wherein at least one of the one or more scripts are provided by a programmer, and the method further comprises an act of selectively processing the source code prior to the compile action responsive to the at least one provided script.

20. The method according to claim 11, further comprising an act of replacing a standard programming operator within the at least one portion of source code with code associated with a custom operator.

* * * * *